(12) United States Patent
Delgado

(10) Patent No.: US 11,248,429 B2
(45) Date of Patent: Feb. 15, 2022

(54) DOWNHOLE TOOL

(71) Applicant: INNOVATION ENERGY AS, Trondheim (NO)

(72) Inventor: Carlos J. Delgado, Trondheim (NO)

(73) Assignee: INNOVATION ENERGY AS, Trondheim (NO)

( * ) Notice: Subject to any disclaimer, the term of this patent is extended or adjusted under 35 U.S.C. 154(b) by 405 days.

(21) Appl. No.: 16/338,438

(22) PCT Filed: Sep. 27, 2017

(86) PCT No.: PCT/NO2017/050249
§ 371 (c)(1),
(2) Date: Mar. 29, 2019

(87) PCT Pub. No.: WO2018/063003
PCT Pub. Date: Apr. 5, 2018

(65) Prior Publication Data
US 2021/0246748 A1    Aug. 12, 2021

(30) Foreign Application Priority Data
Sep. 29, 2016 (NO) .................................. 20161567

(51) Int. Cl.
*E21B 29/00* (2006.01)
*B23H 5/08* (2006.01)
*E21B 29/02* (2006.01)

(52) U.S. Cl.
CPC ............. *E21B 29/005* (2013.01); *B23H 5/08* (2013.01); *E21B 29/02* (2013.01)

(58) Field of Classification Search
CPC ........ E21B 29/00; E21B 29/005; E21B 29/02; B23H 5/08; B23H 5/14; B23H 7/22
See application file for complete search history.

(56) References Cited

U.S. PATENT DOCUMENTS

| 4,144,936 A | 3/1979 | Evans |
| 5,533,572 A | 7/1996 | Brady |
| (Continued) | | |

FOREIGN PATENT DOCUMENTS

| EP | 0 227 456 A2 | 7/1987 |
| EP | 2 995 767 A1 | 3/2016 |
| (Continued) | | |

OTHER PUBLICATIONS

English language Abstract of RU 2227201 C2 (Apr. 20, 2004).
(Continued)

*Primary Examiner* — D. Andrews
(74) *Attorney, Agent, or Firm* — Hershkovitz & Associates, PLLC; Abe Hershkovitz

(57) ABSTRACT

The present invention relates to a downhole tool (23), for removing sections of metal tubing, comprising: at least one conductive element (1) being arranged to corrode a section of metal tubing using an electrolytic process, said conductive element (1) being a tube or a pipe which is made of electric conductive material, an apparatus (4) to establish a connection to the metal tubing (2), and a milling apparatus with cutting or abrasive elements (3) arranged to remove byproducts from the electrolytic process. The invention also relates to a modular downhole tool (45), comprising an elongated main shaft (8) with several modules for insertion in a wellbore.

26 Claims, 9 Drawing Sheets

(56) References Cited

U.S. PATENT DOCUMENTS

| | | |
|---|---|---|
| 5,976,330 A | 11/1999 | Ziegler et al. |
| 6,439,313 B1 | 8/2002 | Thomeer et al. |
| 2012/0152543 A1 | 6/2012 | Davis |
| 2013/0199785 A1 | 8/2013 | Hekelaar |
| 2015/0101812 A1 | 4/2015 | Bansal et al. |
| 2015/0267493 A1 | 9/2015 | Schwartze |
| 2015/0328694 A1 | 11/2015 | Hoop |
| 2016/0245032 A1 | 8/2016 | Hekelaar |
| 2016/0251924 A1 | 9/2016 | Porter |
| 2016/0251925 A1 | 9/2016 | Porter |
| 2017/0260826 A1 | 9/2017 | Crabeil et al. |
| 2018/0163477 A1 | 6/2018 | Faircloth |

FOREIGN PATENT DOCUMENTS

| | | |
|---|---|---|
| RU | 2227201 C2 | 4/2004 |
| RU | 2370625 C1 | 10/2009 |
| WO | WO 02/25050 A2 | 3/2002 |
| WO | WO 2012/170806 A1 | 12/2012 |

OTHER PUBLICATIONS

English language Abstract of RU 2370625 C1 (Oct. 20, 2009).
International Search Report in International Application No. PCT/NO2017/050249, dated Jun. 18, 2018.
International Preliminary Report on Patentability in International Application No. PCT/NO2017/050249, dated Dec. 10, 2018.
EPO Communication in corresponding European Application No. 17 801 517.8, dated Nov. 26, 2020.
Office Action dated Jun. 24, 2021 in related U.S. Appl. No. 16/885,207, filed May 27, 2020.

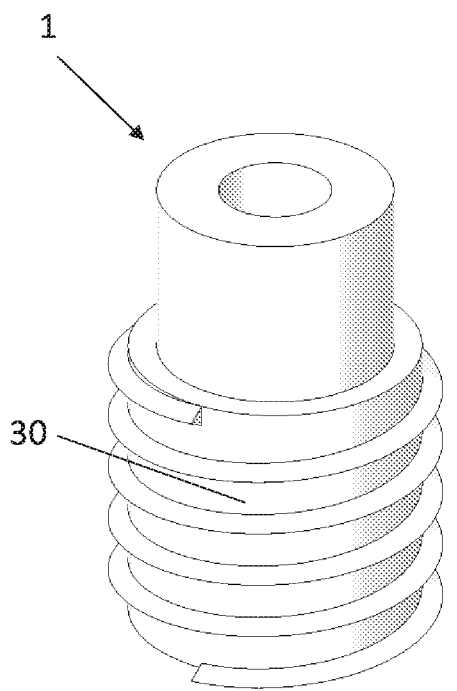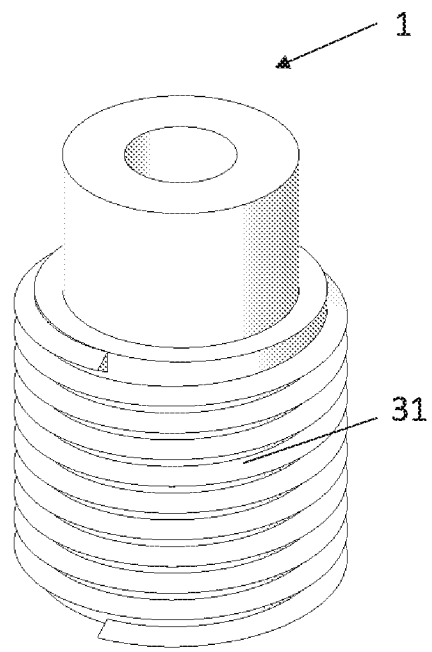
Fig. 10  Fig. 11
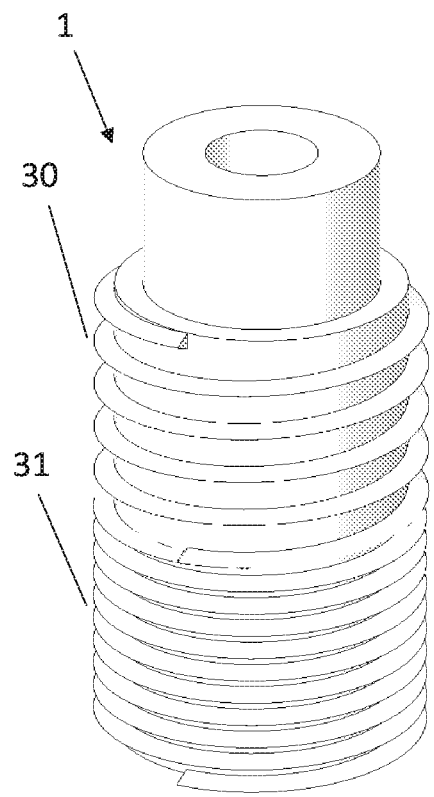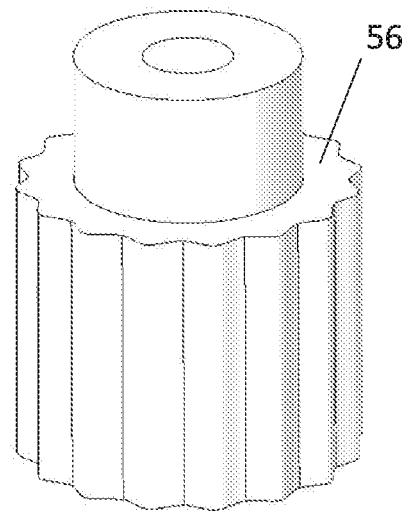
Fig. 12  Fig. 13

DOWNHOLE TOOL

FIELD OF THE INVENTION

The present invention relates to a downhole tool and a modular downhole tool according to the preamble of respective independent claims.

BACKGROUND OF THE INVENTION

Oil and gas wells are ordinarily completed by first cementing metallic casing strings in a wellbore. Depending on the properties of the formation a dual casing string may be employed, for example, including a smaller diameter string deployed internal to a larger diameter string. In such dual-string wellbores, the internal string is commonly cemented to the larger diameter string.

When oil and gas wells are no longer commercial viable, they must be abandoned, and which generally require one or more permanent barriers to isolate the wellbore. The casing string is commonly removed by a milling operation that employs a downhole milling tool having a plurality of circumferentially spaced milling/cutting blades that extend radially outward from a tool body, or by employing electrochemical machining or grinding. During a typical milling operation, the milling tool is deployed on a tool string and rotated in the well bore such that the blades or other equipment make a circumferential cut in the metallic casing string. The tool string is then urged downhole while rotation continues so as to axially mill the casing string to the desired length.

DISCLOSURE OF THE STATE OF ART

U.S. Pat. No. 4,144,936 A disclose an apparatus for milling metal or cutting off the upper ends of pipes and casings in drilling operation or in abandoning and plugging of a well. The tool is to cut through the pipes and casings using electrochemical machining or grinding. It includes radially movable, electrically conductive elements, which form the cathodes of an electrochemical machining operation for removing metal. The tool element further includes an abrasive material (cutting element) so that they can mechanically cut or mill through the cement layers between casings. An electric current is applied through the tool and adjacent pipe or casing and salt water is circulated around the tool and inner wall of the casing and serves as an electrolyte. The subject matter of the invention differs from the disclosure of U.S. Pat. No. 4,144,936 A in that the dual casing milling tool is to corrode entire long sections of pipes and casing. It comprises a shaped and long cathode along the centre of the tool and may use cathode frames in expandable rails with insulated grinding or cleaning elements attached along the length of the tool. Furthermore, the dual casing milling tool can also be a module of a modular downhole tool that comprises additional logging module, drilling module, residual catcher and electromagnetic anchors, among others.

WO 2012/170806 A1 disclose a dual string section-milling tool, which includes a cutting block deployed in a single trip in an axial recess in a tool body. The cutting block is configured to extend radially outward from and retract radially inward towards the tool body. The cutting block is further configured to remove a cement layer in a wellbore. The milling tool is deployed on a tool string and rotated in the well bore such that the blades make a circumferential cut in the metallic casing string. The tool string is then urged downhole while rotation continues so as to axially mill the casing string to the desired length.

US 2015/101812 A1 disclose a dual casing window mill for use in a wellbore includes a tubular housing and a plurality of eccentrically arranged pockets formed in a wall thereof and an arm disposed in each pocket. Each arm has a body portion and a blade portion extending from an outer surface of the body portion and is movable between an extended position and a retracted position. The mill further includes cutters disposed along each blade portion and a block disposed in each pocket and connected to the housing. The mill further includes an actuator for extending the arms towards the casings.

The subject matter of the invention differs from the disclosure of WO 2012/170806 A and US 2015/101812 A1 in that the milling tool comprises an electrolytic milling module to corrode the metal casing or tubing, in addition to the optional electromechanical milling module.

OBJECTS OF THE PRESENT INVENTION

The invention is designed to remove single or multiple sections of metal tubing in a well bore as well as cement. The tool can be operated from the surface or also operate through a control unit located in the subsea installation so a vessel will only be needed for installation and recovery of the tool. The milling tool uses a combination of an electrically conductive element or cathode to corrode the metal tubing combined with an electromechanical mill or grinder to mill, grind or clean said metal tubing in order to remove material, clean the surface and/or create sharp grooves to increase the localized current density. The mill can also be used to clean the cement and drill additional formation.

The milling tool can be operated standalone or be one of the modules of a modular downhole tool.

The tool can be used to open a window in the casing to be able to set a cross-sectional barrier plug.

The invention relates to a milling tool that is designed to open windows in casing or other tubing in wells that will be plugged and abandoned without the need of a rig, the tool can travel along the main axis and rotates following the circumference of the well and further can attach by itself to the casing or tubing through a mechanical or electromagnetic anchor.

The invention can also be used to open the metal tubing for reasons other than plugging and abandonment. One more reason can be, but is not limited to, opening windows for side-tracking operations with coil tubing or conventional drilling by corroding oriented sections of the tubing.

SUMMARY OF THE INVENTION

The above objects are in a first aspect achieved with a downhole tool for removing sections of metal tubing, comprising at least one conductive element being arranged to corrode a section of metal tubing using an electrolytic process, said conductive element being a tube or a pipe which is made of electric conductive material, an apparatus to establish a connection to the metal tubing, and a milling apparatus with cutting or abrasive elements arranged to remove byproducts from the electrolytic process.

Preferred embodiments of the milling downhole tool are disclosed in respective dependent claims.

The conductive element of the downhole tool can be made of electric conductive material such as steel, stainless steel, aluminum, copper, titanium or graphite. The tubes or pipes can be shaped to control the acceleration of corrosion at different positions of the metal tubing with patterns to optimize ratio between the metal tubing and the conductive element areas.

Further, the tubes or pipes can comprise longitudinal grooves or helical grooves, or a combination thereof.

At least one main conductive element is preferable centrally placed on the main shaft of the tool.

Further, several conductive elements can be attached to the main source of electrical current through expandable rails, to allow the conductive elements to be adjusted to an optimal separation from the different size metal tubing.

The conductive elements can be shaped with patterns or grooves to optimize the ratio between the metal tubing and the conductive element areas, and to drive the circulation of fluid around the tool and provide optimal scape paths for byproducts from the electrolytic process.

The milling apparatus grinds, mills or cuts the metal tubing, and may comprise expandable rails to hold abrasive, milling, or cutting elements to remove metal tubing, particles or byproducts from the electrolytic process from said metal tubing, cement or formation, and wherein said rails extending in the longitudinal direction of the tool are straight or are spiraling around the conductive element.

The downhole tool can further comprise components to drive the circulation of the fluid around the conductive elements, and said components can be stand alone or be part of the expandable rails. In case said components to drive the circulation of the fluid are part of the grinding mechanism, they can be made of abrasive material and used as abrasive or milling elements, said abrasive elements having optimal shape to drive the circulation of fluid.

The tool may further comprise one or more of at least one electrical motor for rotation of equipment on the tool, at least one high power AC/DC source, at least one module for transferring of power and movement of the tool, at least one coupling system for connection to other equipment or strings in the wellbore, and at least one apparatus to provide vibration to the conductive element.

The downhole tool can contain at least one clamping module comprising a mechanical, hydraulic, or electromagnetic device to anchor and centralize the top and bottom parts of the main body to the metal tubing.

According to a second aspect of the invention, the above objects are also achieved with a modular downhole tool, comprising at least one electrolytic milling module with one or several conductive elements to corrode a section of metal tubing using an electrolytic process, said conductive element being a tube or a pipe which is made of electric conductive material, as well as a apparatus to establish a connection to the metal tubing, said electrolytic milling module being arranged to corrode the metal tubing using an electrolytic process, and said electrolytic milling module is further being equipped with a milling apparatus with cutting or abrasive elements, and at least one electromechanical milling module with an expandable arm equipped with a drill bit or saw blade.

Preferred embodiments of the modular downhole tool are disclosed in respective dependent claims.

The drill bit or saw blade on the expandable arm of the electromechanical milling module can be arranged to mill metal tubing residues, cement, and formation as well as control completion cables or any other means after the electrolytic milling module has opened a window in the metal tubing. Said expandable arm can be expandable perpendicular to the direction of the main shaft.

The modular downhole tool may further comprise any suitable logging module containing sensors to log properties from the formation, and the environment around the tool.

The modular downhole tool may further comprise a communication unit which provides attachment to a wire and connects the tool to a subsea installation or surface.

The modular downhole tool may further comprise a residues catcher with a basket and a magnet to recover solid metallic residues.

The conductive element of the electrolytic milling module can be tubes or pipes made of electric conductive material, such as steel, stainless steel, aluminum, titanium, copper or graphite, and wherein the tubes or pipes are shaped to control the acceleration of corrosion at different positions of the metal tubing with patterns to optimize ratio between the metal tubing and conductive element areas.

The tubes or pipes of the electrolytic milling module can comprise longitudinal grooves or helical grooves, or a combination thereof.

The modular downhole tool may comprise at least one clamping module to anchor and centralize the main shaft or its modules to the metal tubing of the wellbore.

At least one main conductive element of the electrolytic milling module can be centrally placed on the main shaft of the modular downhole tool.

Further, several conductive elements of the electrolytic milling module can be attached to the main source of electrical current through expandable rails, to allow the conductive elements to be adjusted to an optimal separation from the different size metal tubing.

The conductive elements can be shaped with patterns or grooves to optimize the ratio between the metal tubing and the conductive element areas, and to drive the circulation of fluid around the tool and provide optimal scape paths for byproducts from the electrolytic process.

The milling apparatus in the electrolytic milling module grinds, mills or cuts the metal tubing, and may comprise expandable rails to hold abrasive, milling, or cutting elements to remove metal tubing, particles or byproducts from the electrolytic process from said metal tubing, cement or formation, and wherein said rails extending in the longitudinal direction of the tool are straight or are spiraling around the conductive element.

The milling apparatus in the electrolytic milling module may comprise components to drive the circulation of the fluid around the conductive elements, and said components can be stand alone or be part of the expandable rails.

The modular downhole tool can further comprise components to drive the circulation of the fluid around the conductive elements, and said components can be stand alone or be part of the expandable rails. In case said components to drive the circulation of the fluid are part of the grinding mechanism, they can be made of abrasive material and used as abrasive or milling elements, said abrasive elements having optimal shape to drive the circulation of fluid.

The milling apparatus in the electrolytic milling module may further comprise one of at least one electrical motor for rotation of equipment on the tool, at least one high power AC/DC source, at least one module for transferring of power and movement of the tool, at least one coupling system for connection to other equipment or strings in the wellbore, and at least one apparatus to provide vibration to the conductive element.

DESCRIPTION OF THE DIAGRAMS

Embodiments of the present invention will now be described, by way of example only, with reference to the following diagrams wherein:

FIGS. 6 to 13 show different shapes of conductive elements included in the milling tool.

DESCRIPTION OF PREFERRED EMBODIMENTS OF THE INVENTION

Figure 1:
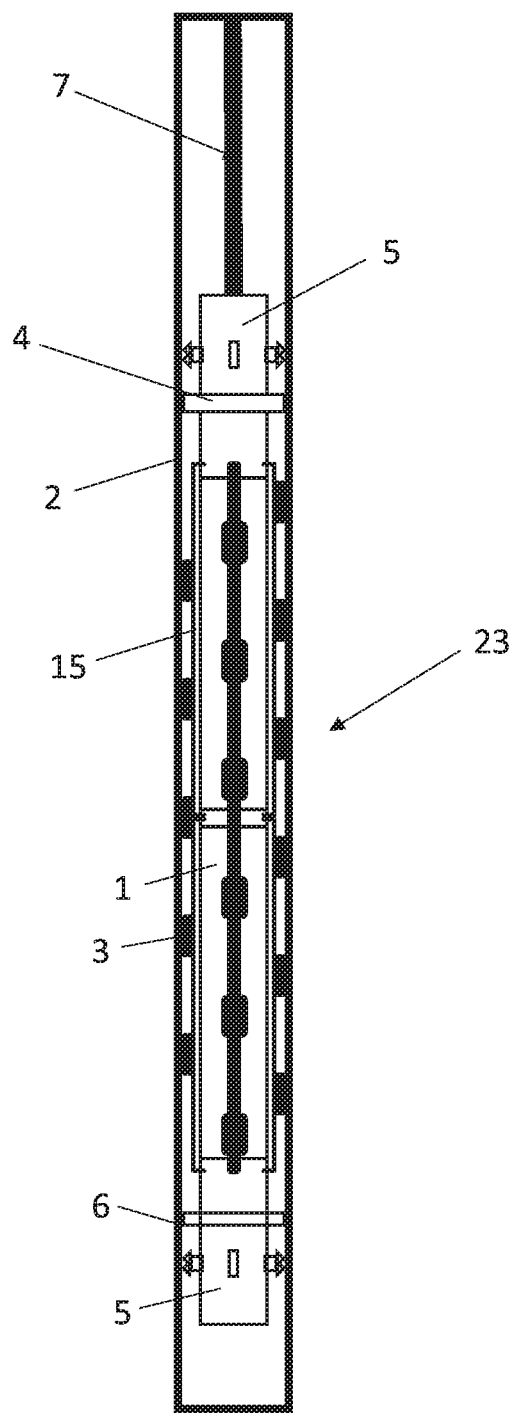
FIG. 1 shows one embodiment of a milling tool according to the invention.

A downhole tool, such as a milling tool, according to the invention will be described first. As seen in FIG. 1, the milling tool 23 comprises several components. The tool is shown inserted in a metal tubing 2 of a wellbore. The tool 23 comprises a connection 7 to the surface, for instance a wire. Clamping elements 5, preferable packers and anchors at the top and at the bottom of the tool, in where the clamping elements 5 in a known way are equipped with expandable parts that can apply a force on the inside of the metal tubing to engage with the tubing 2.

The tool further comprises an apparatus such as an expandable connector 4 for creating a connection to the metal tubing 2, and at least one conductive element such as a cathode 1, said parts being used to corrode the metal tubing using an electrolytic process.

Figure 1A:
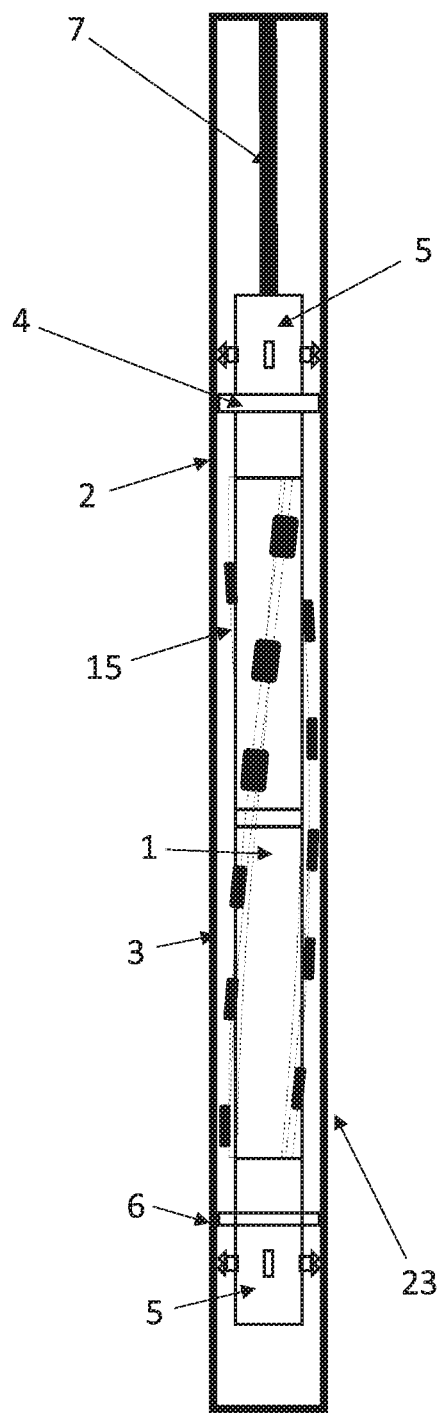
FIG. 1a shows another embodiment of a milling tool according to the invention

Also included in the milling tool 23 is abrasive or milling elements 3 that can rotate around the cathode 1 while an electrical current is applied. The milling elements 3 are preferable mounted on expandable rails 15, said rails extending in the longitudinal direction of the tool. The rails can be straight as shown in FIG. 1, or can be spiraling around the cathode 1 as shown in FIG. 1a. The rails can also be connected to the source of electrical current and work as cathodes, by including additional cathodes 53. The abrasive or milling elements 3 can as mentioned rotate around or with the cathode 1, but the elements 3 can also be moved up and down, or rotate around their own axis.

To rotate the milling elements 3 and the conductive elements 1, the tool may comprise electrical motors 40.

There can be components 6 that drive the circulation of the fluid around the tool. These components can for instance be standalone propellers or be attached to the expandable rails 15. Other methods to recirculate the fluid around tool may include pumping new electrolytes from the surface.

Further details and operation of the milling tool shall now be explained.

When operated as standalone the milling tool 23 may consist of the following components:

Packers and anchors: The tool contains mechanical, hydraulic, or electromagnetic clamping elements 5 that can anchor and centralize the top and bottom parts of the main tool or its modules to the metal tubing. It could also contain a packer in order to separate the fluid below the tool. This packer can also be placed independently from the tool and at different depths.

Electrically conductive elements or cathodes 1, 53: The function of the conductive elements or cathodes 1 and 53 is to corrode the metal tubing 2 in the wellbore using an electrolytic process. The tool 23 can contain one or several shaped conductive elements 1 and 53 as well as the connection apparatus 4 to establish the connection to the metal tubing 2. The main cathode 1 is positioned in the center of the well, and can be of many conductive materials like, but not limited to, steel, stainless steel, aluminum, titanium, copper or graphite. The cathode can also have different shapes similar, but not limited to, the conductive elements shown in FIGS. 6 to 13, with the purpose of controlling the acceleration of corrosion at different positions of the metal tubing 2 by modifying the surface area of the cathode. Several conductive elements 53 can be attached to the tool frame through the expandable arms or rails 15 and to the source of electrical power allowing the conductive elements to be adjusted to the optimal separation from the different size metal tubing 2.

The conductive elements can be tubes, pipes or plates with for instance lengths of a few centimeters to several meters, and be made of electric conductive material including but not limited to steel, stainless steel, aluminum, titanium, copper or graphite.

Said conductive elements 1 or 53 can be combined with an apparatus that grinds, mill or cut the metal tubing 2. The apparatus uses the expandable rails 15 to hold abrasive, milling, or cutting elements 3 to remove particles from said metal tubing. The rails 15 can as mentioned also contain cathodic elements and be electrically connected to the main cathode 1 or other sources of electrical power.

The abrasive or milling elements 3 can for instance rotate around or with the cathode 1 while an electrical current is applied. The process can also be performed by alternating grinding and then applying an electrical current.

The rails holding the milling elements 3 and the rails holding some of the cathodic elements may or may not be the same rails, but are for ease of understanding of the drawings given same reference number 15.

Said rails extending in the longitudinal direction of the tool can be straight as in FIG. 1 or can be spiraling around the cathode 1 as shown in FIG. 1a.

The pattern in the tubing after the grinding element has removed particles can be a smooth surface or contain sharp grooves, with different patterns with the purpose of modifying the surface area of the anode.

The removal of particles can be performed maintaining the same internal diameter throughout all the section of tubing or it can be performed removing more or less material in different sections of the tubing.

The tool can contain the components 6 that drive the circulation of the fluid around the tool. These components can as mentioned be standalone propellers, or be part of the grinding mechanism. If said components are part of the grinding mechanism, they can also be made of abrasive material and be used as abrasive or milling elements 3. In this case, the abrasive elements will have the optimal shape to drive the circulation of fluid. The circulation can also be achieved by shaping the cathodic elements 53 on the rails 15. Other methods to recirculate the fluid around tool may include pumping new electrolytes from the surface.

The clamping modules 5 of the tool are used to immobilize and centralize the tool in the tubing.

Milling Tool Standalone Operation:

The tool 23 is lowered in to the well as a conventional wireline tool. It is positioned at the desired depth and the anchors 5 are activated.

The anchors 5 of the milling tool 23 are activated and lock the module in to the desired position. The conductive elements 1 are provided with optimal electrical current and the accelerated corrosion of the metal tubing starts. The conductive elements 1 can also be provided with vibration at an optimal frequency to allow the gas bubbles forming in the cathode 1 to escape more quickly. The grinding apparatus with expandable rails 15 and milling elements 3, opens and positions itself in the optimal separation to the metal tubing 2. The apparatus starts rotating with optimal RPM and force against the metal tubing 2. The angle of the rails 15 relative to the metal tubing 2 can be such that the lower part of said metal tubing 2 will be grinded faster than the upper part of the metal tubing 2. This can also be accomplished by using grinding elements with different thinness or positions relative to the center of the tool along the rails. The expandable rails 15 can also be fitted with conductive elements 53 that will be positioned at an optimal distance from the anode in order to reduce the voltage drop across the electrolyte.

By monitoring the electrical current provided to the cathodes, as well as the torque generated by the grinding apparatus, the operator or the tool itself, decides if the metal tubing has been fully corroded. Once the current levels have dropped to the simulated desired level, the tool can be moved to a new zone where there is metal tubing to start the process again.

As previously described, the milling tool can also be operated as part of a modular downhole tool. The milling tool may also be a module part of other downhole tools.

Figure 2:
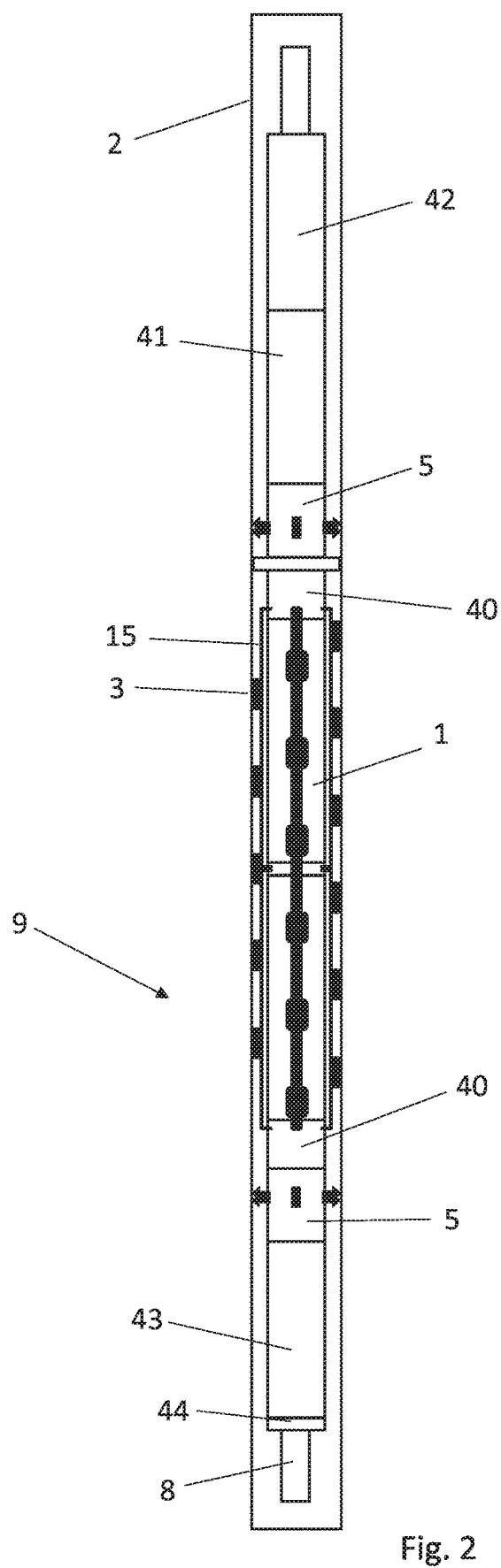
FIG. 2 shows the milling tool according to the invention, equipped with couplings to other tools.

The milling tool may therefore also comprise, as seen in FIG. 2, an upper connector 42 for transferring of power and for movement of the module in the wellbore. A lower connector 43 for the same purpose can be installed in a lower part of the tool. In addition, the tool may comprise a coupling system 44 for connections to other modules or tools.

Figure 3:
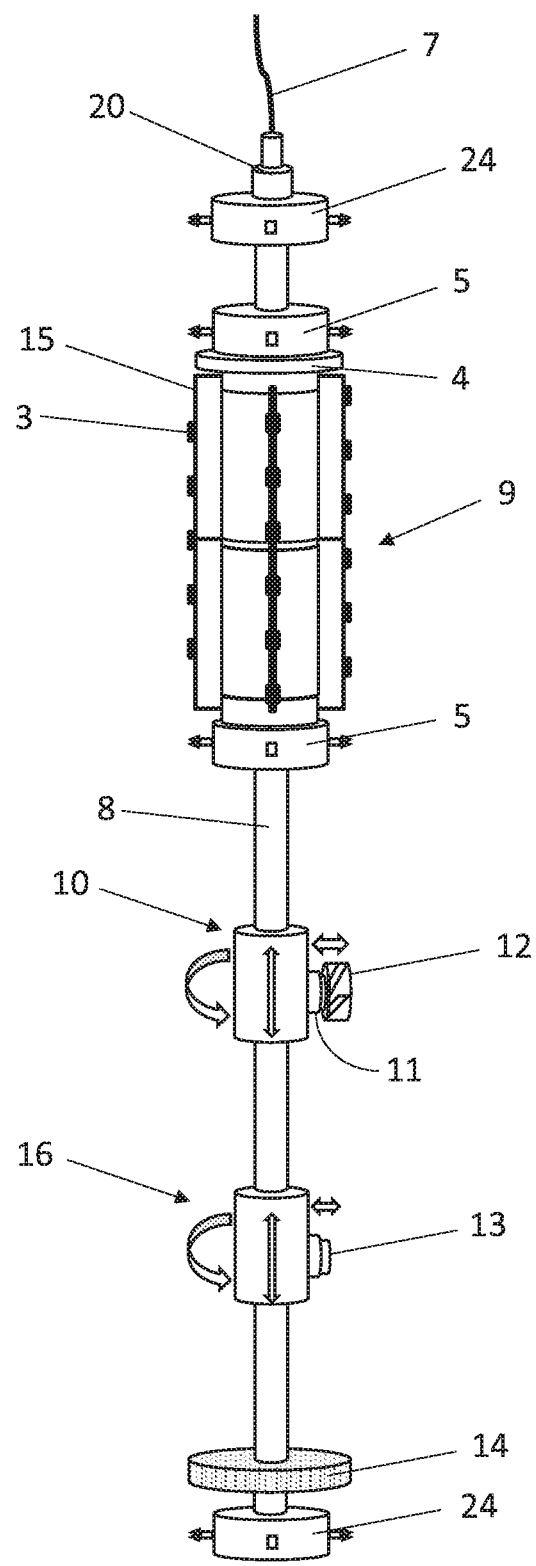
FIG. 3 shows a modular downhole tool according to the invention, including the milling tool.

A modular downhole tool 45 shall now be described, as seen in FIG. 3.

The modular downhole tool can consist of several main components:

Control: The control unit (not shown) provides the necessary power and instrumentation to control the tool. The control unit also can allow the tool to function automatically and unmanned. The unit is placed in a subsea installation or at the surface. It can also be attached to a network to be monitored and controlled remotely.

Communication: A communication unit 20 provides the attachment to a wire 7 and connects the tool to the subsea installation or surface. The tool can be powered and controlled through a wire. Through this unit, the tool can also be attached to a tractor device in order to be pushed to the desired zone in deviated wells or run with coil tubing or drill pipe.

Packers and anchors: The tool contains mechanical, hydraulic, or electromagnetic device 24 that can anchor and centralize the top and bottom parts of the main tool or its modules to the metal tubing 2. It could also contain a packer in order to separate the fluid below the tool. This packer can also be placed independently from the tool.

Electrolytic milling module: The function of the module 9 is to corrode the metal tubing using an electrolytic process, as explained in relation to the downhole tool of FIGS. 1-2. The module 9 contains at least one main cathode 1, and may be also several cathodic elements 53, as well as a component 4 to establish the connection to the metal tubing 2. The conductive elements 53 can be attached to the module frame through expandable arms or rails 15 that can allow the conductive elements to be adjusted to the optimal separation from the different size metal tubing 2. The module can rotate following the circumference of the well and travel along the main axis or shaft 8 of the tool 45.

Said conductive elements can be combined with an apparatus that grinds, mill or cut the metal tubing 2. The apparatus uses expandable rails 15 to hold abrasive, milling, or cutting elements 3 to remove particles from said metal tubing.

The abrasive or milling elements 3 can rotate around or together with the cathode 1 while an electrical current is applied. The process can also be performed by alternating grinding and then applying an electrical current.

The rails holding the milling elements 3 and the rails holding the cathodic elements 53 may or may not be the same rails, but are for ease of understanding of the drawings given same reference number 15.

Said rails extending in the longitudinal direction of the tool can be straight as in FIG. 1 or can be spiraling around the cathode 1 as shown in FIG. 1a.

The pattern in the tubing after the grinding elements 3 has removed particles can be a smooth surface or contain sharp grooves.

The removal of particles can be performed maintaining the same internal diameter throughout all the section of tubing 2 or it can be performed removing more or less material in different sections of the tubing 2.

The tool can contain components 6 that drive the circulation of the fluid around the tool. These components can be standalone propellers or be part of the grinding mechanism. If said components are part of the grinding mechanism, they can also be made of abrasive material and be used as abrasive or milling elements 3. In this case, the abrasive elements will have the optimal shape to drive the circulation of fluid. The circulation can also be achieved by shaping the cathodic elements 53 on the rails 15. Other methods to recirculate the fluid around tool may include pumping new electrolytes from the surface.

The tool 45 can contain clamping modules 5, 24 that can immobilize and centralize the tool or its modules in the tubing.

Electromechanical milling module: This module 10 may consist of an expandable arm 11 attached to a drill bit 12 or saw blade. The expandable arm allows the bit or saw blade to drill/cut perpendicular to the direction of the well. The function of the electromechanical milling module is primarily to mill metal tubing residues, cement, and formation as well as control completion cables 17. The module 10 can rotate following the circumference of the well and travel along the main axis or shaft 8 of the tool 45. The bit or saw blade 12 can contain PDC cutters, tungsten carbide inserts or other hard facing material such as diamond inserts. It also uses methods to anchor and centralize itself to the metal tubing.

Another method to cut or drill in a perpendicular direction to the well is by using a standalone apparatus with expandable rails 15 with abrasive or cutting elements 3 such as the apparatus used in the electrolytic milling module 9.

Logging module: This module 16 contains sensors 13 to log properties from the formation, metal tubing and the environment around the tool 45. Some of the measurements could be caliper, torque, temperature, gamma ray, formation pressure, laterolog or electromagnetic resistivity, to mention a few. These sensors can be placed in expandable arms to get them closer to the formation. The integrity of the cement behind the tubing 2 can be measured with this sensor module. It may also use methods to anchor and centralize itself to the metal tubing 2.

Residues catcher: This component consist on a basket 14 and a magnet to recover solid metallic residues.

Modular Downhole Tool Operation:

The tool 45 is lowered in to the well as a conventional wireline tool. It is positioned at the desired depth and the anchors 24 are activated. The tool can be placed in the desired position by using the measured depth from the wireline unit or the formation evaluation sensors included in the logging module 16.

With the tool 45 locked in position, the packers can be activated. The fluid above the packers can be exchanged with an electrolytic solution. This step might not be necessary if the well has been through a kill well operation previously and an electrolytic solution is already in place.

The anchors 5 of the electrolytic milling module 9 are activated and lock the module to the desired position. The conductive elements are provided with optimal electrical current and the accelerated corrosion of the metal tubing 2 starts. The conductive elements 1 can also be provided with vibration at an optimal frequency to allow the gas bubbles forming in the cathode to escape more quickly. The grinding apparatus with expandable rails 15 and milling elements 3, opens and positions itself in the optimal separation to the metal tubing 2. The apparatus starts rotating with optimal RPM and force against the metal tubing 2. The angle of the rails 15 relative to the metal tubing 2 can be such that the lower part of said metal tubing 2 will be grinded faster than the upper part of the metal tubing 2.

By monitoring the electrical current provided to the cathode 1 as well as the torque generated by the grinding apparatus, the operator or the tool itself, decides if the metal tubing 2 has been fully corroded. Once the currents level have dropped to the simulated desired level, the electrolytic milling module 9 travels along the main shaft 8 to a new zone where there is metal tubing to start the process again.

When the metal tubing 2 is corroded and the electrolytic milling module 9 is moved to a new place along the main shaft 8 of the tool 45, the electromechanical milling module 10 moves to the newly open zone where there is none or little metal tubing left.

The drill bit or saw blade 12 of the electromechanical milling module 10, which is pointing perpendicular to the direction of the well, starts rotating, powered by a motor. The telescopic shaft 11, where the bit/saw blade 12 is attached, moves the bit towards the wall or control completion cables to start the milling/cutting. The depth of milling/cutting can be controlled by using electrical power/torque measurements in order to guarantee that the electrical motor does not stall. With the bit-face or blade now in contact and milling material, the electromechanical milling module 10 rotates following the circumference of the well. Once the bit has milled the entire circumference, the module 10 moves along the shaft 8 of the tool 45 to where there is new material to be milled and the operation starts again. This process continues automatically until a new metal tubing 2 or formation is reached. As the position of the bit is known at all times by using sensors in the expandable arm 11 and the module itself, the bit/saw blade can be safely stopped just before reaching the new layer. The bit 12 can also drill into the formation in order to guarantee that the permanent plug is set in new formation. This process can also be done milling along the axis of the tool 45 first and later rotating the module 10. Alternatively, the process to remove the cement could be done with ultrasonic milling.

The tool 45 will perform the electrolytic and the electromechanical milling until the desired window is opened. If needed, this window could be as long as 50 m as described in current Plug & Abandonment procedures.

The sensor module 13 is activated to take desired measurements such as a scan of the cement behind the next metal tubing string in order to log the integrity of the cement and/or metal tubing.

The residues catcher module 14 collects the debris and other residues from operation.

The anchors in the clamping modules 24 are deactivated and the tool 45 is now ready to be moved to another zone of interest or pulled out of the hole.

Figure 4:
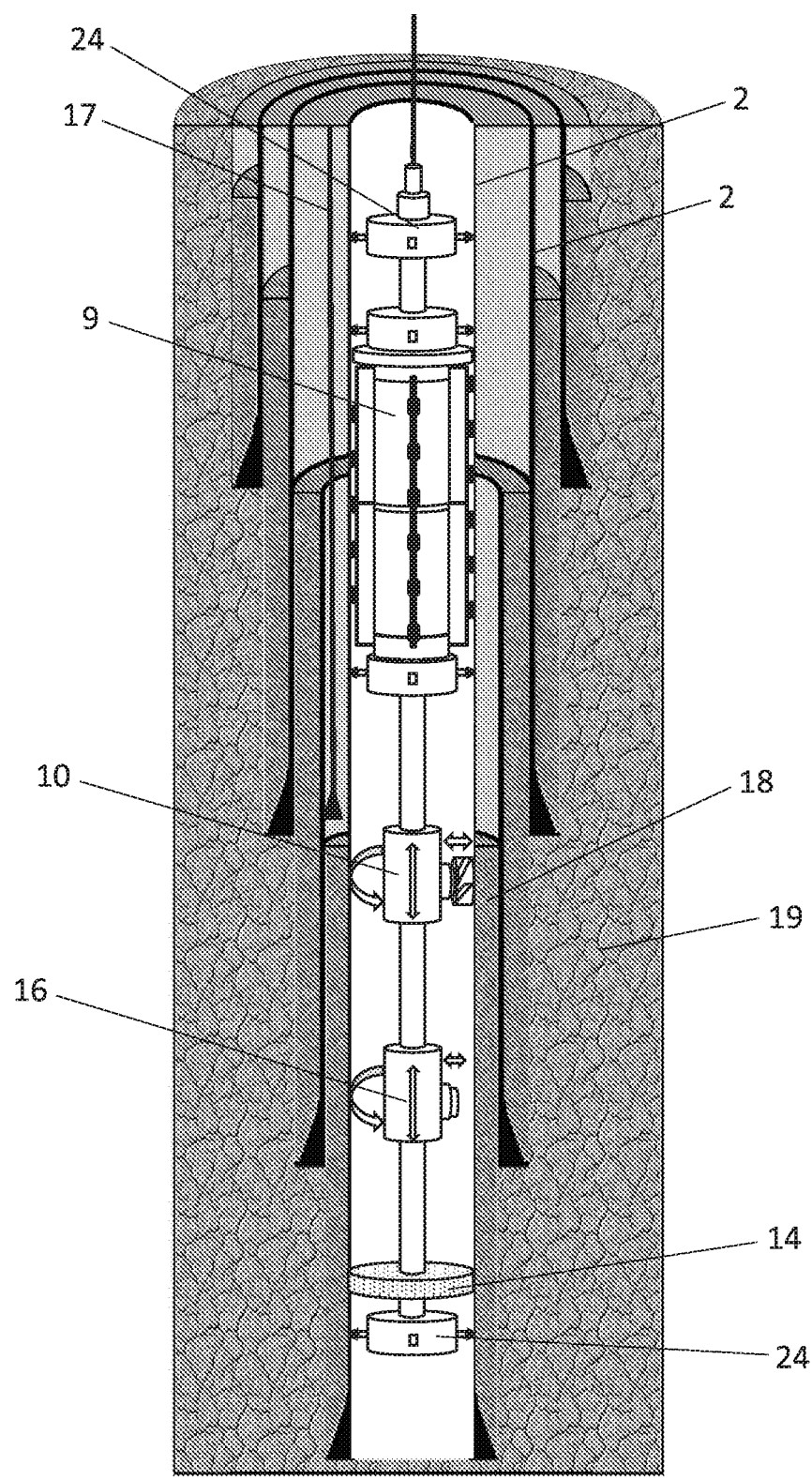
FIGS. 4 and 5 show different embodiments of the modular downhole tool inserted in a wellbore.
Figure 5:
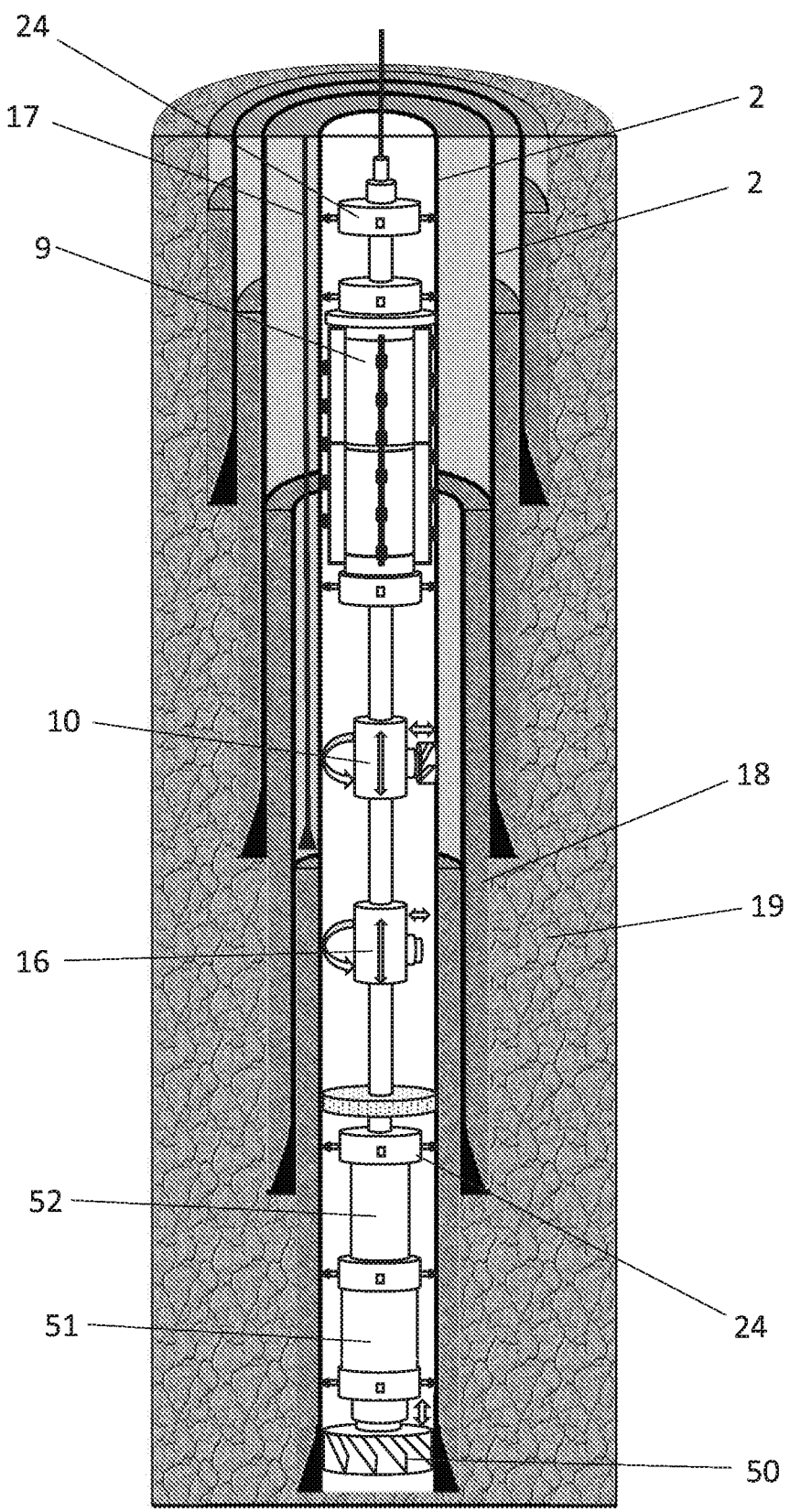

FIGS. 4 and 5 shows the modular downhole tool 45 inserted in a wellbore, in where additional reference numbers denote control completion cables 17, cement 18 and formation 19 in a wellbore. FIG. 4 depicts the modular downhole tool 45 described above. FIG. 5 shows the same, but with additional equipment that can be mounted to the tool, such as clamping and driving units 51, 52 for a drill bit 50 to be used if there is need to remove obstacles inside the tubing 2.

The conductive elements 1 can as mentioned have several different shapes, as shown in FIGS. 6 to 13, and be shaped to control the acceleration of corrosion at different positions of the metal tubing 2 with patterns to optimize ratio between the metal tubing 2 and the conductive elements 1.

Figure 6:
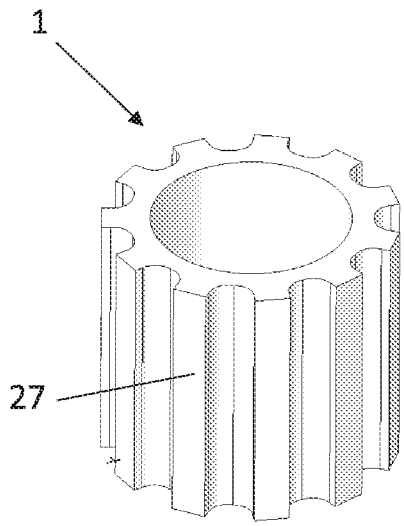
Figure 7:
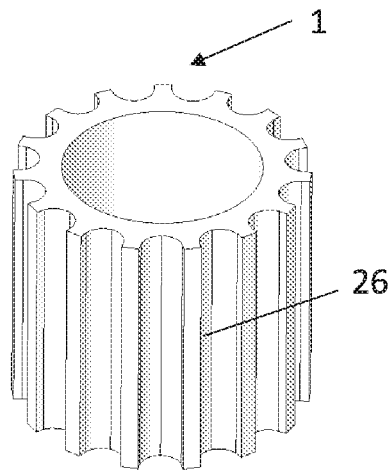
Figure 8:
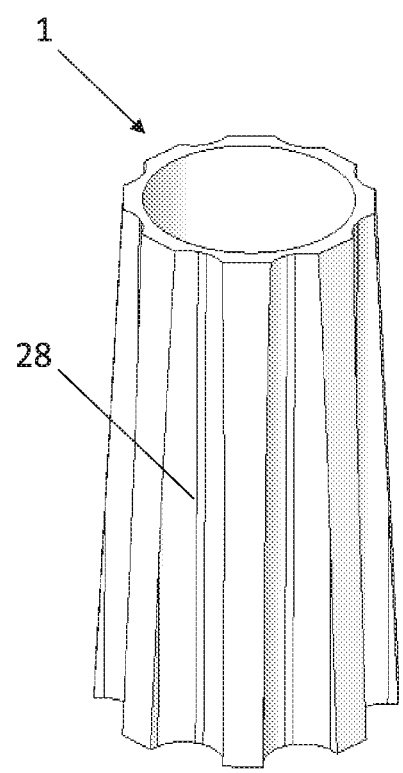
Figure 9:
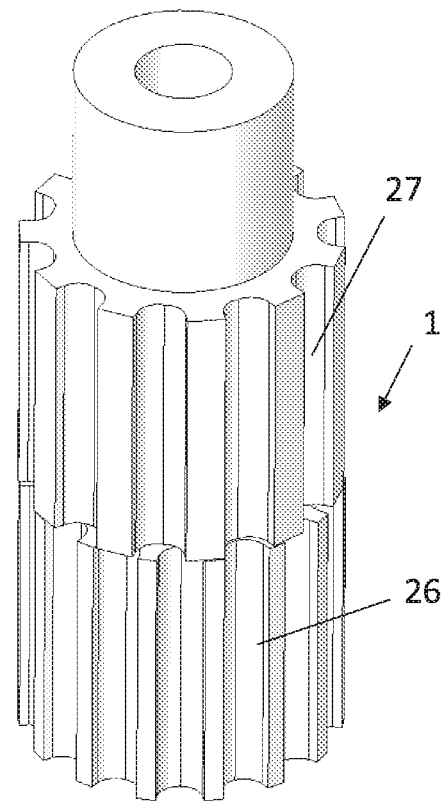

In FIGS. 6 and 7 the cathode 1 is shown for instance with grooves with a shape similar to a gear shaft, but with different shaped grooves or number of teeth 26, 27. In FIG. 8 the cathode 1 has a conical shape with corresponding grooves 28. Such a conical shape as shown in FIG. 8 allows the different part of the cathode to be adjusted to the optimal separation from the different size metal tubing 2. The conical and cylindrical shaped conductive elements can also be without grooves. FIG. 9 shows a cathode 1 as a combination of the conductive elements shown in FIGS. 6 and 7.

The conductive elements may also have helical shaped grooves as shown in FIGS. 10 and 11. FIG. 10 shows coarse grooves 30, while FIG. 11 shows fine grooves 31. FIG. 12 shows a combination of the conductive elements in FIGS. 10 and 11.

In FIG. 13 the cathode is shown with a sinusoidal shape 56. The conductive elements can also be as a combination of different sinusoidal shapes.

Figure 16:
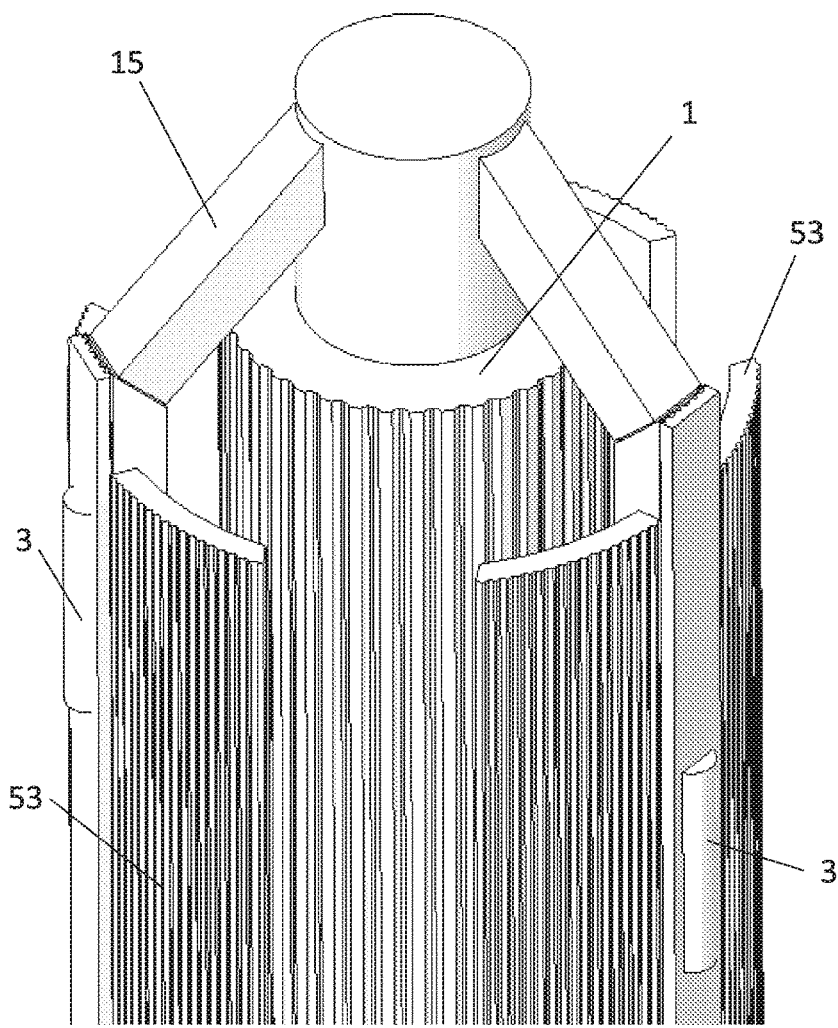
FIG. 16 shows alternative conductive elements attached to rails of the milling tool.

The rails 15 can as mention have conductive elements attached, as shown in FIG. 16, to optimize the distance between the cathode and the anode and reduce the voltage drop across the electrolyte.

Figure 14:
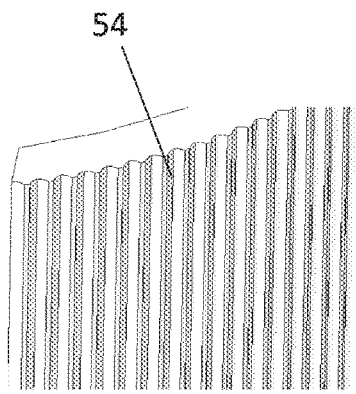
FIGS. 14 and 15 show further shaped grooves of conductive elements included in the milling tool.
Figure 15:
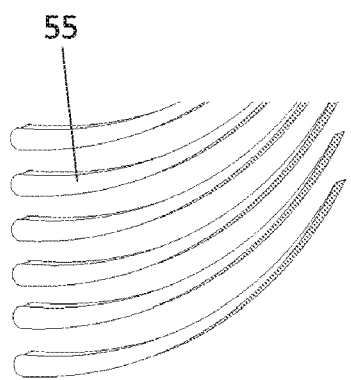

The conductive elements 53 attached to the rails 15 can have different shapes grooves 54, 55 as shown in FIGS. 14 and 15. These shapes are to optimize the ratio between the metal tubing 2 and the conductive element 53 areas; drive the circulation of fluid around the tool and provide optimal scape paths for byproducts from the electrolytic process.

The invention claimed is:

1. A downhole tool for removing sections of a metal tubing, the tool comprising:
   at least one conductive element for corroding a section of the metal tubing using an electrolytic process with an electrolyte and configured to control acceleration of corrosion at different positions of the metal tubing, said conductive element being one of, a cylindrical or conical tube made of an electrically conductive material; and
   an apparatus configured to establish connection to the metal tubing,
   wherein the tube comprises at least one of, longitudinal grooves or helical grooves.

2. The downhole tool according to claim 1, wherein the tool further comprises a milling apparatus with one of, cutting or abrasive elements for removing byproducts of the electrolytic process.

3. The downhole tool according to claim 2, wherein the milling apparatus grinds, mills or cuts the metal tubing, and comprises expandable rails to hold one of, abrasive, milling, or cutting elements to remove byproducts of the electrolytic process from said metal tubing, and wherein said rails extend in a longitudinal direction of the tool and are one of, straight or spiraling around the at least one conductive element.

4. The downhole tool according to claim 3, comprising components to drive a circulation of the fluid around the at least one conductive element, and said components are configured to be stand alone or part of the expandable rails.

5. The downhole tool according to claim 1, wherein the at least one conductive element is centrally placed in the tool.

6. The downhole tool according to claim 1, wherein several conductive elements are attached to an electrical power source and expandable rails, to allow a separation distance between the conductive elements and the metal tubing to be adjusted and to reduce a voltage drop across the electrolyte.

7. The downhole tool according to claim 6, wherein said conductive elements are shaped with one of, patterns or grooves to drive circulation of fluid around the tool and provide escape paths for byproducts of the electrolytic process.

8. The downhole tool according to claim 1, comprising components to drive a circulation of fluid around the at least one conductive element, and said components are configured to be one of, stand alone or part of expandable rails.

9. The downhole tool according to claim 8, wherein said components to drive the circulation of the fluid are part of a grinding mechanism, and are made of abrasive material and used as abrasive or milling elements, said abrasive or milling elements having a shape to drive the circulation of fluid.

10. The downhole tool according to claim 1, including at least one clamping module comprising one of, a mechanical, hydraulic, or electromagnetic device to anchor and centralize at least one of, top and bottom parts of a main body to the metal tubing.

11. A downhole tool for removing sections of a metal tubing, the tool comprising:
at least one conductive element for corroding a section of the metal tubing using an electrolytic process with an electrolyte and configured to control acceleration of corrosion at different positions of the metal tubing, said conductive element being one of, a cylindrical or conical tube made of an electrically conductive material; and
an apparatus configured to establish connection to the metal tubing,
wherein the tool further comprises at least one electrical motor for rotation of equipment on the tool, at least one high power AC/DC source, at least one module for transferring power and movement of the tool, at least one coupling system for connection to other equipment or strings in a wellbore, and at least one apparatus to provide vibration to the at least one conductive element.

12. A modular downhole tool, comprising an elongated main shaft with several modules for insertion in a wellbore, said tool comprising:
at least one electrolytic milling module with at least one conductive element for corroding a section of metal tubing using an electrolytic process and configured to control acceleration of corrosion at different positions of the metal tubing; said at least one conductive element being one of, a cylindrical or conical tube made of an electrically conductive material
an apparatus configured to establish a connection to the metal tubing,
a milling apparatus with cutting or abrasive elements for removing byproducts of the electrolytic process, and
at least one electromechanical milling module with an expandable arm equipped with one of, a drill bit or a saw blade.

13. The modular downhole tool according to claim 12, wherein the drill bit or saw blade on the expandable arm of the electromechanical milling module mills one of, metal tubing residues, cement, formation and control completion cables.

14. The modular downhole tool according to claim 12, wherein said expandable arm is expandable perpendicularly to the direction of the main shaft.

15. The modular downhole tool according to claim 12, wherein the tool further comprises a logging module containing sensors to log properties from one of, a formation, cement, metal tubing, and an environment around the tool.

16. The modular downhole tool according to claim 12, wherein the tool further comprises a communication unit which provides attachment to a wire and connects the tool to one of, a subsea installation or a surface.

17. The modular downhole tool according to claim 12, wherein the tool further comprises a residues catcher with a basket and a magnet to recover solid metallic residues.

18. The modular downhole tool according to claim 12, wherein the tube of the electrolytic milling module comprises at least one of, longitudinal grooves or helical grooves.

19. The modular downhole tool according to claim 12 wherein the tool comprises at least one clamping module to anchor and centralize the main shaft or its modules to the metal tubing of the wellbore.

20. The modular downhole tool according to claim 12, wherein the at least one conductive element of the electrolytic milling module is centrally placed on the main shaft of the tool.

21. The modular downhole tool according to claim 12, wherein several conductive elements of the electrolytic milling module are attached to the electrical power source and expandable rails, to allow a separation distance between conductive elements and the metal tubing to be adjusted and to reduce a voltage drop across the electrolyte.

22. The modular downhole tool according to claim 21, wherein said conductive elements are shaped with patterns or grooves to drive the circulation of fluid around the tool and provide escape paths for byproducts of the electrolytic process.

23. The modular downhole tool according to claim 12, wherein the milling apparatus grinds, mills or cuts the metal tubing, and comprises expandable rails to hold abrasive, milling, or cutting elements to remove byproducts of the electrolytic process from said metal tubing, cement or formation, and wherein said rails extending in the longitudinal direction of the tool are one of, straight or spiraling around the at least one conductive element.

24. The modular downhole tool according to claim 12, wherein the milling apparatus comprises components to drive a circulation of the fluid around the at least one conductive element, and said components can be stand alone or be part of expandable rails.

25. The modular downhole tool according to claim 24, wherein said components to drive the circulation of the fluid are part of a grinding mechanism, and are made of abrasive material and used as abrasive or milling elements, said abrasive or milling elements having optimal shape to drive the circulation of fluid.

26. The modular downhole tool according to claim 12, wherein the milling apparatus in the electrolytic milling module further comprises at least one electrical motor for rotation of equipment on the tool, at least one high power AC/DC source, at least one module for transferring of power and movement of the tool, at least one coupling system for connection to other equipment or strings in the wellbore, and at least one apparatus to provide vibration to the at least one conductive element.

* * * * *